United States Patent
Le Borgne et al.

(10) Patent No.: US 10,144,135 B2
(45) Date of Patent: Dec. 4, 2018

(54) SYSTEM, METHOD AND COMPUTER PROGRAM PRODUCT FOR HANDLING HUMANOID ROBOT INTERACTION WITH HUMAN

(71) Applicant: SOFTBANK ROBOTICS EUROPE, Paris (FR)

(72) Inventors: Mathias Le Borgne, Paris (FR); Bruno Maisonnier, Paris (FR); Jérôme Monceaux, Paris (FR); Taylor Veltrop, Paris (FR); Thibault Hervier, Paris (FR); Guillaume Jacob, Paris (FR); Gwennaël Gate, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 150 days.

(21) Appl. No.: 15/129,401

(22) PCT Filed: Apr. 17, 2015

(86) PCT No.: PCT/EP2015/058353
§ 371 (c)(1),
(2) Date: Sep. 26, 2016

(87) PCT Pub. No.: WO2015/158876
PCT Pub. Date: Oct. 22, 2015

(65) Prior Publication Data
US 2017/0100842 A1    Apr. 13, 2017

(30) Foreign Application Priority Data
Apr. 17, 2014 (EP) .................................... 14305577

(51) Int. Cl.
  *B25J 11/00* (2006.01)
  *B25J 9/16* (2006.01)
  *B25J 13/00* (2006.01)

(52) U.S. Cl.
CPC ......... *B25J 11/0005* (2013.01); *B25J 9/1694* (2013.01); *B25J 9/1697* (2013.01); *B25J 13/00* (2013.01)

(58) Field of Classification Search
CPC ...... B25J 11/0005; B25J 9/1697; B25J 13/00; B25J 9/1694
(Continued)

(56) References Cited

U.S. PATENT DOCUMENTS 6,853,880 B2 * 2/2005 Sakagami .............. G06N 3/008
  318/568.2
8,401,825 B2 * 3/2013 Ascari .................... B25J 9/1612
  702/190
(Continued)

FOREIGN PATENT DOCUMENTS

| JP | 2004-283959 A | 10/2004 |
| JP | 2004-299025 A | 10/2004 |
| KR | 10-2004-0050055 A | 6/2004 |

*Primary Examiner* — Jaime Figueroa
(74) *Attorney, Agent, or Firm* — Baker & Hostetler LLP (57) ABSTRACT

A method of handling humanoid robot interaction with human is disclosed. The method allows systematically storing all events detected within a humanoid robot environment, and classifying as temporary stimuli. When the robot is set to analyze the events, a process allows selecting one preferred stimulus among the stored stimuli and depending on the current activity of the robot, one or more actions are generated for the robot.

15 Claims, 4 Drawing Sheets

(58) Field of Classification Search
USPC .......................................................... 700/245
See application file for complete search history.

(56) References Cited

U.S. PATENT DOCUMENTS

| | | | | |
|---|---|---|---|---|
| 2004/0015265 | A1* | 1/2004 | Asano | B25J 13/003 |
| | | | | 700/245 |
| 2004/0117063 | A1* | 6/2004 | Sabe | G05B 19/4097 |
| | | | | 700/245 |
| 2004/0199292 | A1* | 10/2004 | Sakagami | G05D 1/0251 |
| | | | | 700/259 |
| 2005/0197739 | A1* | 9/2005 | Noda | B25J 11/001 |
| | | | | 700/245 |
| 2007/0156485 | A1* | 7/2007 | Sanabria | G06Q 10/06 |
| | | | | 705/7.26 |
| 2007/0192910 | A1* | 8/2007 | Vu | B25J 5/007 |
| | | | | 700/245 |
| 2011/0007174 | A1* | 1/2011 | Bacivarov | G06K 9/00281 |
| | | | | 348/222.1 |
| 2012/0185090 | A1* | 7/2012 | Sanchez | B25J 11/0005 |
| | | | | 700/253 |
| 2014/0222206 | A1* | 8/2014 | Mead | B25J 9/1697 |
| | | | | 700/259 |
| 2015/0217449 | A1* | 8/2015 | Meier | B25J 9/1602 |
| | | | | 700/257 |
| 2016/0180568 | A1* | 6/2016 | Bullivant | G06T 13/40 |
| | | | | 345/473 |

* cited by examiner

SYSTEM, METHOD AND COMPUTER PROGRAM PRODUCT FOR HANDLING HUMANOID ROBOT INTERACTION WITH HUMAN

CROSS-REFERENCE TO RELATED APPLICATIONS

This application is a National Stage of International patent application PCT/EP2015/058353, filed on Apr. 17, 2015, which claims priority to foreign European patent application No. EP 14305577.0, filed on Apr. 17, 2014, the disclosures of which are incorporated by reference in their entirety.

FIELD OF THE INVENTION

The present invention relates generally to the field of robot programming and more particularly relates to a system, method and computer program product for handling humanoid robot interaction with human.

BACKGROUND ART

While robotic has a long standing life in industry, and becomes more and more integral part of personal services, the humanoid robotic is still at its premises as a lot of new issues are to be addressed for creating humanoid robots that integrate human behavior to become companion robots.

Most of the known humanoid robots appear as quite passive or static ones when interacting with a human. They generally respond with standardized reactions to human solicitation, have limited pro-active decisions, making thus the robot/human relationship less attractive for a user.

Building a humanoid robot having a more natural interaction with human is a complex task raising numerous technical problems, not to be compared with interaction problems of users with common general computers.

Among those problems, a wrong human perception and/or a false human detection may lead to inappropriate or even dangerous robot behaviors, raising thus security issues when a human and a robot are in interaction.

Then there is a need for systems and methods improving humanoid robot interaction with human. The present invention offers a solution to this need.

SUMMARY OF THE INVENTION

Accordingly, an object of the invention is to provide a system and a method allowing a robot to be more collaborative with human and acting as having his/her own awareness.

To achieve the foregoing object, a system, method and computer program product as further described in the appended independent claims 1, 13 and 14 are provided.

In particular, a method, implemented within a humanoid robot, of handling humanoid robot interaction with human, the method comprises the steps of:

storing as temporary stimuli in a stimuli store, events detected within a humanoid robot environment, the events being stored with at least an indication of the position of the event and being grouped according to the type of the event detected in at least one of movement stimuli group, sound stimuli group, touch stimuli group, people stimuli group, the stimuli store further storing permanent stimuli to force an action of the humanoid robot;

determining when an event detected fits a people stimulus, i.e. a stimulus originating from a human;

using pertinence rules, selecting one stimulus among the stored stimuli and said people stimulus;

processing said selected stimulus by triggering a specific scenario software routine, the software routine depending on a current activity of said humanoid robot and on a current engagement mode with a human, wherein the engagement mode representing a tracking relationship of the humanoid robot with a human, such that the robot can break the current engagement by engaging with someone else or not; and in response to the processing step, generating one or more actions of the humanoid robot.

In an embodiment, the events are one or more of movement detection, tactile sensing, sound localization, face detection, visual perception, image recognition.

Advantageously, the temporary stimuli are grouped according to the type of the event detected in at least movement stimuli group, sound stimuli group, touch stimuli group, people stimuli group.

In an embodiment, the stimuli store further comprises pseudo-stimuli group to store permanent stimuli.

Advantageously, the pertinence rules use priority criteria between the stimuli and pseudo-stimuli groups.

Advantageously, the determining step consists in using information provided by a 2D camera and/or a 3D camera.

In an embodiment, the current activity of the humanoid robot is to track a human.

In another embodiment, the processing step further comprises the step of using the indication of the position of the event corresponding to the selected stimulus for determining if a new human is found in an area around the direction of the stimulus.

Advantageously, the one or more humanoid robot actions comprise actuating robot members to track a new human.

Advantageously, one of the actuation consists in orienting the sensors towards the position of the stimulus detected.

Still advantageously, the method further comprises the step of updating the stimuli store with information on the position of the new human found.

Advantageously, the method allows maintaining the humanoid robot in a visually alive state even when no stimulus is sensed, thereby allowing small movements of the robot members like breathing or using LEDs or producing sounds to show his/her availability for an upcoming interaction.

The invention also provides a system for handling a humanoid robot interaction with human. The system operates under the control of an operating system and comprises at least one processor; and means coupled to the processor for implementing the steps of the method.

The invention may also be provided as a computer program product comprising a non-transitory computer readable storage medium, and program code stored on the computer readable storage medium and configured, upon execution, to cause the processor to operate the steps of the method.

Further aspects of the invention will now be described, by way of preferred implementation and examples, with reference to the accompanying figures.

BRIEF DESCRIPTION OF THE DRAWINGS

The above and other items, features and advantages of the invention will be better understood by reading the following more particular description of the invention in conjunction with the figures wherein.

DETAILED DESCRIPTION OF THE INVENTION

Embodiments of the invention are described herein after by way of examples with reference to the accompanying figures and drawings.

Figure 1:
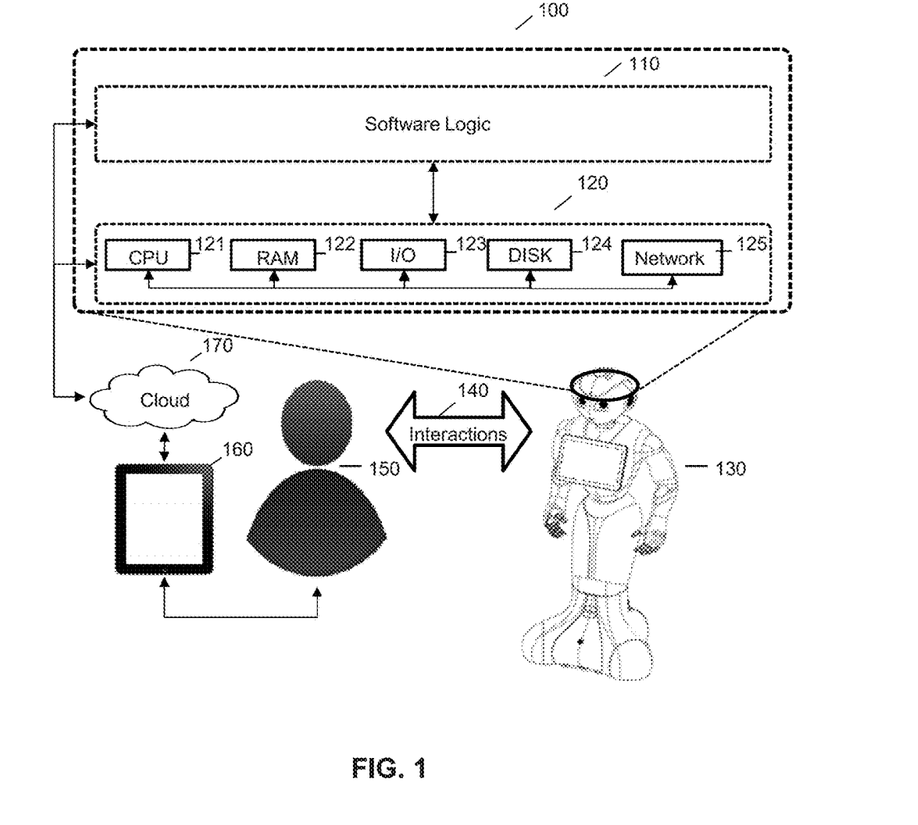
FIG. 1 shows a general environment for implementing the system of the present invention.

Going first to FIG. 1, a general technical environment to operate the invention is described. A robot 130 comprises sensors and actuators. A logic module or "mind logic" 100 is implemented in the robot or associated with it (for example remotely) and comprises a collection of software 110 and hardware components 120.

A preferred embodiment of a humanoid robot to implement the present invention is fully described in patent application titled "Humanoid Robot With An Autonomous Life Capability" filed the same day by the Applicant, wherein the mind logic is implemented as part of an operating system called NAOqi™ OS.

The robot 130 is interacting (by bilateral or two-ways communications 140, including one or more dialog sessions) with one or more users 150. Said one or more users can access other computing devices 160 (for example a personal computer such as a wearable computer or a smartphone or a tablet), which can be connected devices (in communication with a cloud of servers and/or a fleet of other robots or connected objects, etc). In particular, a connected device can be a wearable computer (e.g. watch, glasses, immersive helmet, etc).

The specific robot 130 on the figure is taken as an example only of a humanoid robot in which the invention can be implemented. The lower limb of the robot on the figure is not functional for walking, but can move in any direction on its base which rolls on the surface on which it lays. The invention can be easily implemented in a robot which is fit for walking.

In some embodiments of the invention, the robot can comprise various kinds of sensors. Some of them are used to control the position and movements of the robot. This is the case, for instance, of an inertial unit, located in the torso of the robot, comprising a 3-axis gyrometer and a 3-axis accelerometer. The robot can also include two 2D color RGB cameras on the forehead of the robot (top and bottom). A 3D sensor can also be included behind the eyes of the robot. The robot can also optionally comprise laser lines generators, for instance in the head and in the base, so as to be able to sense its relative position to objects/beings in its environment. The robot can also include microphones to be capable of sensing sounds in its environment. The robot of the invention can also include sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route. To translate its emotions and communicate with human beings in its environment, the robot of the invention can also include LEDs, for instance in its eyes, ears and on its shoulders and loudspeakers (for example located in its ears). The robot can communicate with a base station, with other connected devices or with other robots through various networks (3G, 4G/LTE, Wifi, BLE, mesh, etc). The robot comprises a battery or source of energy. The robot can access a charging station fit for the type of battery that it includes. Position/movements of the robots are controlled by its motors, using algorithms which activate the chains defined by each limb and effectors defined at the end of each limb, in view of the measurements of the sensors.

In a specific embodiment, the robot can embed a tablet with which it can communicate messages (audio, video, web pages) to its environment, or receive entries from users through the tactile interface of the tablet. In another embodiment, the robot does not embed or present a screen but it does have a video projector, with which data or information can be projected on surfaces in the vicinity of the robot. Said surfaces can be flat (e.g. floor) or not (e.g. deformations of the projecting surfaces can be compensated to obtain a substantially flat projection). In both embodiments (with screen and/or with a projector), embodiments of the invention remain valid: the claimed interaction model is only supplemented or complemented by visual interaction means. In any case, would the graphical means be out of order or deactivated on purpose, the conversational mode of interaction remains.

In an embodiment, the robot does not comprise such graphical user interface means. Existing humanoid robots are generally provided with advanced speech capabilities but are generally not provided with GUI. Increasing communities of users will probably not use graphical means (e.g. tablet, smartphone), even as a complement, to communicate with the robot, by choice and/or necessity (young people, impaired persons, because of a practical situation, etc).

Figure 2:
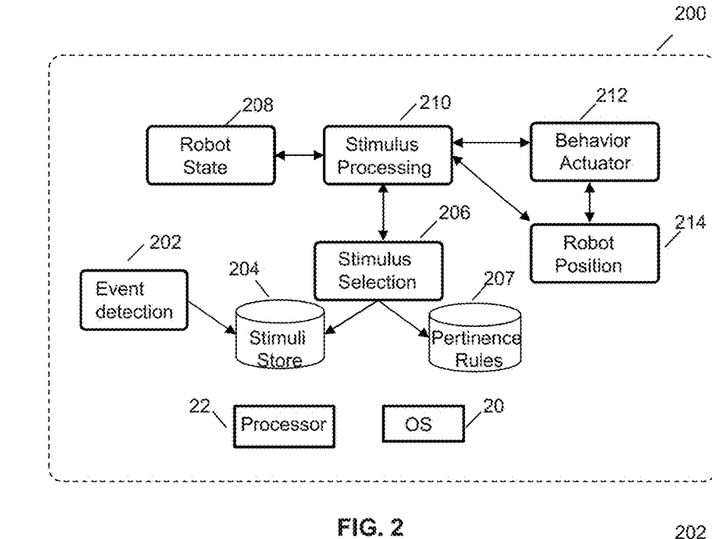
FIG. 2 is a block diagram of an exemplary interaction system in accordance with an embodiment of the present invention.

FIG. 2 provides a block diagram that illustrates the main components of an interaction handling system 200 in accordance with an embodiment of the present invention. The interaction handling system 200 may be configured to perform the operations of handling the interaction of a humanoid robot with a human in response to processing external events detected by an event detection component 202. The event detection component is further detailed below with reference to FIG. 3.

The interaction handling system 200 comprises a stimuli store 204 to store stimuli outputted by the event detection component 202. The interaction handling system 200 further comprises a stimulus selection component 206 coupled to a pertinence rules database 207 defining a set of rules for selecting a stimulus to be processed by a stimulus processing component 210.

A robot state component 208 is coupled to the stimulus processing component 210 for providing additional information on the robot state, particularly on the engagement situation of the robot. The output of the stimulus processing component 210 is coupled to a robot behavior actuation component 212. The robot behavior actuation component 212 allows generating a behavior of the humanoid robot in response to the stimulus processing component 210. A robot position component 214 is also part of the system 200 for servoing the position of the robot according to the human displacements.

As also shown on FIG. 2, the interaction handling system 200 is operating under the control of an operating system 20 and at least one processor 22. In a preferred embodiment, the operating system is the NAOqi™ OS already mentioned, wherein the interaction handling system of the invention is implemented as a component called "Basic Awareness Service" which subscribes to an "Extractor Services" component. The Basic Awareness component is configured based on the situation or configured by a Running Activity or is acting on its own.

The Stimuli Store 204 allows temporary storing every stimulus that is provided by the event detection component 202 until a stimulus is validated as being from a human. For ease of the description, such stimulus originating from a human is later named a 'people stimulus' in the description while any other kind of stimulus is named a 'non-people stimulus'. The temporary stimuli in the store are organized in groups according to the type of the event detected. As such the store comprises a movement stimuli group for grouping all stimuli received from any of movement sensors, a sound stimuli group for grouping all stimuli received from any sound sensors, a touch stimuli group for grouping all stimuli received from any tactile sensors and a people stimuli group for grouping all stimuli received from a people perception detector.

Additional stimuli which are not provided directly by the detectors but are stimuli signals generated internally are also stored in the stimuli store as permanent stimuli and named hereinafter 'pseudo-stimuli'. When selected by the stimulus selection component 206, a pseudo-stimulus is processed by the stimulus processing component 210.

Examples of such pseudo-stimuli are:
"Force-People" pseudo-stimulus providing similar information as people stimulus, but having a higher priority in the pertinence rules;
"Reset-Head" pseudo-stimulus used to reset the robot head to its default position. This pseudo-stimulus is of lower priority in the pertinence rules.

Advantageously, the temporary stimuli may be deleted from the stimuli store. In a preferred implementation, the stimuli store is emptied after a stimulus is processed. However, the person skilled in the art would apply different criteria without departing from the scope of the invention.

The Stimulus Selection component 206 allows selecting the stimulus that most likely lead to detect a human from the stimuli store. The pertinence rules allow determining the more relevant stimulus based for example on priority criteria. The pertinence rules may be predefined or updated by a programmer depending on the context of the use of the humanoid robot.

In a preferred embodiment, the priorities are hierarchically defined for the groups of stimuli, with the more likely to be associated to a human having the higher priority, leading to rank the stimuli as follow: the Force-People stimulus of higher priority, next the people stimuli group, next the touch stimuli group, next the sound stimuli group, next the movement stimuli group, and the Reset-Head stimulus in the lower priority.

Whereas the pertinence rules are preferably defined for detecting a human in the environment of the humanoid robot, the person skilled in the art would easily devise any other pertinence rules adapted to another application.

The stimulus selection component comprises software routine based on the pertinence rules for comparing stimuli of a same group and determining the more relevant one within the group. The determination may be based on the time the stimulus is stored in the stimuli store, or may be for example to use the last stimulus stored in a group as for the touch group for example. However, any other determination criteria could be implemented. For example, the sound detection generates a confidence parameter, and the selection within the sound group is made by determining the higher confidence parameter and selecting the corresponding stimulus. Another example, the determination for the movement group may be based on determining the movement stimulus corresponding to the biggest region of interest.

The Robot State component 208 allows storing information on the current state of the robot. Initially, a robot is in an inactive state having no activity. Whenever a robot enters in activity, the robot state component collects data about the current conditions, the situation and the context. The conditions of the robot state at the time a selected stimulus is processed triggers a specific scenario to be operated by the stimulus processing component 210 and as exemplified below with reference to FIGS. 4a to 4c.

The Behavior Actuation component 212 allows controlling physical actions of the robot to such as:

motion by activating motors of the joints or the base of the robot;

tracking to follow motion of a human being in the environment of the robot in order to establish and maintain eye contact with the human;

lighting of robot's LEDs to communicate emotions;

animated speech and combinations of speech and gestures.

The robot behaviors are a combination of movements, words, lightings which may express emotions of the robot and allow it to perform complex actions.

As previously mentioned, advantageously the invention allows rendering the humanoid robot more interactive and lively by modulating the positions of the robot facing a human speaker to generate more interest and commitment during a dialogue. In addition, the invention allows preserving a threshold safety distance and orientation of the robot to ensure safety of the human. The invention augments the quality of the human/humanoid robot interaction and solves security problems between a user and the robot being in close interaction by guaranteeing real-time positioning and preserving confidence distance and direction between the two.

To achieve those goals, the behavior actuation component 212 is coupled to a robot position component 214 for servoing the position of the robot according to the human displacements. Advantageously, the humanoid robot is able not only to follow the human movements but is able to have humanoid poses and attitudes that provoke interest and emotion for the human while preserving in real-time a safety distance and orientation between the robot and the human.

The robot position component 214 computes in real time, position (x,y) and orientation (wz) parameters of a human body (including torso and shoulders line) in interaction with the robot. The robot position component uses acquisition of 2D and 3D images relatively to the origin of the robot axes to obtain a 3D oriented "human blob" representative of the human being in interaction with the robot. The humanoid robot adjusts his/her position in real-time on the fly in accordance with movements of the blob ensuring a selected distance and orientation is respected with the human preserving confidence intervals to limit oscillations. A confidence interval is a threshold on the amplitude of the tracked movements under which the robot may not move. Thus, a robot will only follow those movements that are over the threshold value. Typically, a 20 cm threshold is defined for a robot's base movement, meaning the human has to move of at least 20 cm to allow the robot to move too.

Additionally, the values of distance and/or orientation and/or the confidence intervals of these values are periodically updated to force the robot to change its position in space vis-à-vis the human. The values may be modified either randomly or relatively to the context of a current interaction. For example, while in a dialogue activity, by using a syntaxic analysis of the content of the dialogue, the values are adapted thereby guaranteeing natural movements in relation with the dialogue context. Thus, the humanoid robot is regularly set in motion either in a servo operating mode to the movement of the human, either in a forced mode by changing the values of its relative position.

In a preferred implementation, the default values of the distance and orientation of the robot at the beginning of an interaction range from −65 cm+/−10 cm along the X axis, 0 cm+/−10 cm along the Y axis, and 0°+/−10° Wz. For example, with those values, at the beginning of an interaction, a humanoid robot can be at 62 cm in front of a human with an angle of 7° of its body relatively to the human.

Still in a preferred embodiment, the default frequency of changing the X position and/or Y position and/or Wz orientation and/or confidence intervals, may be set to 0.1 Hz or 0.2 Hz. By default, the distance value along the X axis can range from −100 cm to −40 cm, +/−10 cm; the distance value along the Y axis can range from −45 cm to +45 cm, +/−10 cm; the orientation value can range from −45° to +45°+/−10°; the confidence intervals value can range from 0.1 cm to 30 cm for distance, and from 0.1° to 30° for orientation angle.

The person skilled in the art would easily devise any other default values depending on the humanoid robot dimensions.

Advantageously, the servo operating mode of the humanoid robot by the regular and constant adjustment of the position of the robot relative to the movements of the human allows modulating the robot movements even in a non predictable context.

Figure 3:
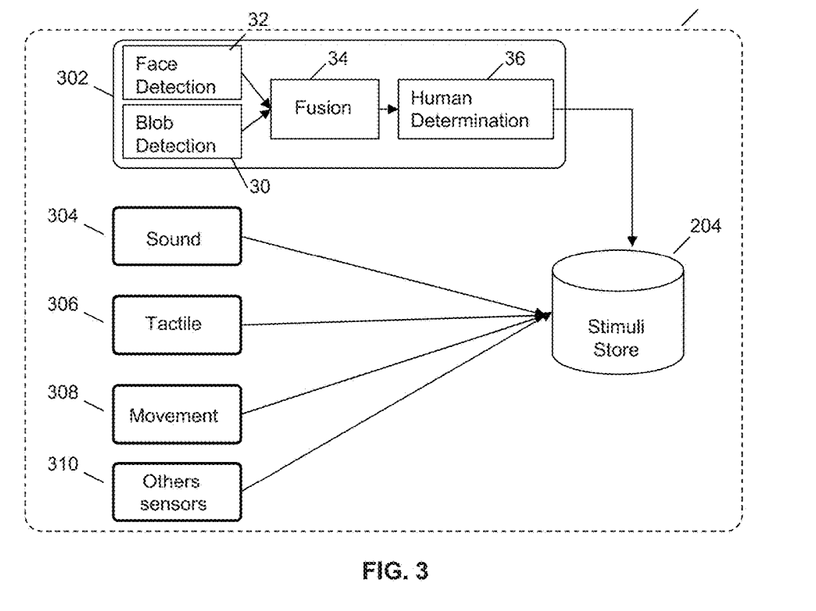
FIG. 3 is a detailed block diagram of the event detection module of FIG. 2 in accordance with an embodiment of the present invention.

With reference to FIG. 3, a detailed block diagram of the event detection component 202 of FIG. 2 is now described. The event detection component 202 comprises a plurality of detectors (302, 304, 306, 308, 310) allowing to detect external events within the environment of the humanoid robot. The plurality of detectors may be equipped with sensors such as camera, microphone, tactile and olfactory sensors to name a few in order to receive and sense images, sound, odor, taste, etc. The sensor readings are preprocessed so as to extract relevant data in relation to the position of the robot, identification of objects/human beings in its environment, distance of said objects/human beings, words pronounced by human beings or emotions thereof.

A people perception detector 302 allows detecting human by using information provided by a 3D camera 30 and/or a 2D camera 32. In operation, a depth image provided by the 3D camera is processed to extract different objects in a scene. The resulting objects are analyzed through a series of filters to determine whether or not they could be human shapes. Preferably, the filters are based on coarse geometric properties like width and height or on the fact that a head can be distinguished from a body, etc. The 2D camera (32) is used to run face detection on the extracted object using the RGB image. The outputs of both 2D and 3D cameras are combined (34) in a fusion module and processed (36) to determine if an object extracted from the depth image is a human shape. In a preferred embodiment, a Kalman filter is used for processing the outputs of both cameras. When an object is validly detected as being a human, the object is added to a base of valid detections which will be tracked over time. The people perception detector generates people perception stimuli to be stored in the group of people perception stimuli in the stimuli database 204.

A sound detector 304 allows detecting sound around the robot using microphones able to sense sounds in its environment. Once a sound is detected, details on the sound are gathered, including for example level of energy, localization of the origin of the sound in order to provide a confidence parameter on the accuracy of the localization of the sound. The sound detector generates sound stimuli to be stored in the group of sound stimuli in the stimuli database 204.

A tactile detector 306 allows detecting an impact or touch on the surface of the robot using tactile sensors. Once an impact is detected, details of the nature of the impact are gathered. The tactile detector generates tactile stimuli to be stored in the group of tactile stimuli in the stimuli database 204.

A movement detector 308 allows detecting movements around the robot using the 3D camera. Once a moving object is detected, details are gathered including for example position with respect to the robot, size, and so. The movement detector generates movement stimuli to be stored in the group of movement stimuli in the stimuli database 204.

The event detection component 202 may comprise various additional detectors 310 to sense a plurality of events, such as gaze direction analysis, face characteristics (age, gender estimation, "smile degree", head pose, facial expression, etc.).

To summarize, when an event is detected, each detector may output a 'detector-of-the-kind' stimulus with an indication of the position the stimulus comes from and the corresponding stimulus is stored in the respective group of stimuli in the stimuli database 204. The indication of the event position may be a position defined by (x,y,z) coordinates or may be at least an approximate direction for the position of the event with (theta/phi) angular coordinates information.

In the preferred embodiment of the NAOqi™ OS, the event detection component 202 is part of an "Extractor Services" used for receiving input readings from robot sensors of the type described in relation with FIG. 1. Some examples of the Extractor Services are: People Perception to perceive the presence of human beings in the vicinity of the robot, Movement Detection to detect the movements of these human beings, Sound Localization to locate a sound, Touch Detection to interpret a touch on a robot tactile sensor, Speech Recognition, Emotion Recognition to identify the emotion expressed by a human being in the vicinity of the robot through its words or gestures.

Figure 4A:
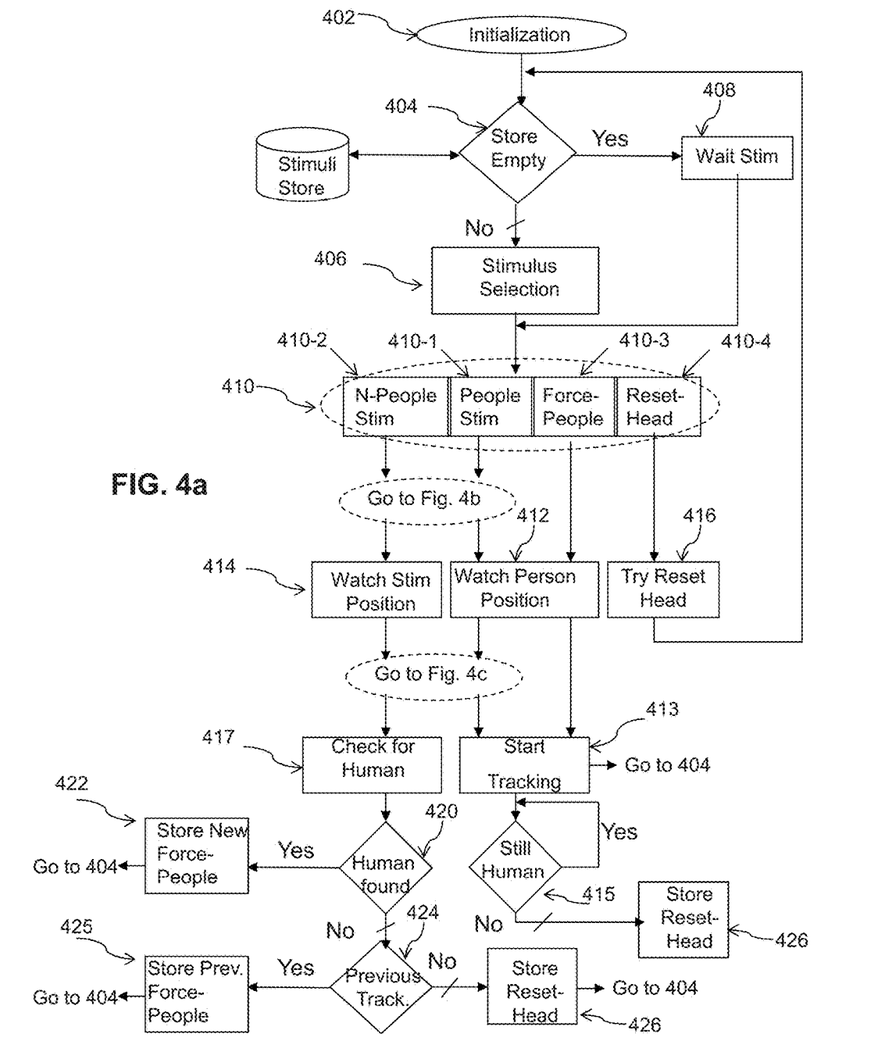
FIGS. 4a to 4c are flowcharts illustrating the main steps of handling the robot interaction according to various engagement situations.
Figure 4B:
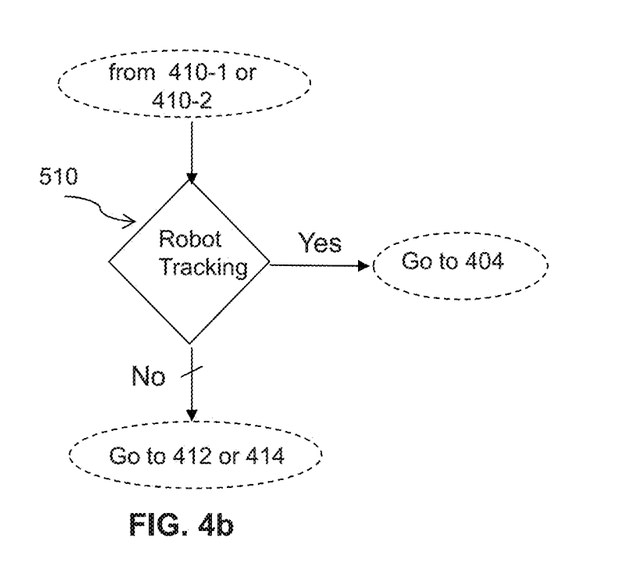
Figure 4C:
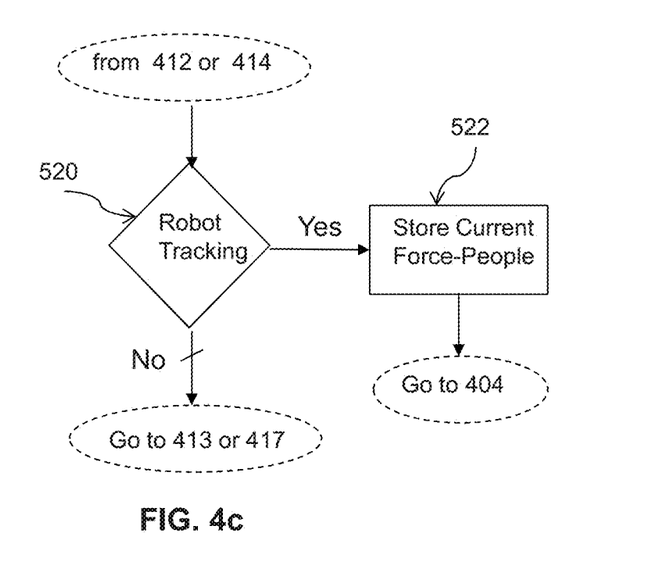

FIGS. 4a to 4c show several flowcharts illustrating the main steps of various interaction scenarios according to different states of the robot.

As previously mentioned, initially a robot is in an inactive state. When it starts tracking a person, the robot is said as "engaged" or as being in an "engagement situation or engagement mode" with the person found—the engaged person—it has started tracking. Advantageously, the robot is maintained in a visually alive state even when no stimulus is sensed, allowing small movements of the robot members like breathing or producing LEDs animations or sounds to show his/her availability for an upcoming interaction.

A robot can break the engagement by engaging with someone else depending on the processing of a stimulus, or when the current engaged person is lost. The robot can break his/her current engagement if the stimulus processing leads to the detection of a human, by processing a people stimulus or a Non-People stimulus combined with the Force-People pseudo-stimulus.

In the context of the present invention, three engagement modes are defined:

"Fully-Engaged" mode: when a robot is "fully-engaged", it stops listening to any stimuli events until the current engaged person is lost;

"Unengaged" mode: the robot can break the current engagement situation when a stimulus is detected;

"Semi-Engaged" mode: the robot is still listening to stimuli, but will not switch to another person. If a stimulus is heard in this semi-engagement mode, the robot may even look at the stimulus, but will always invalidates the stimulus and will still track back the engaged person.

FIGS. 4a to 4c show the main steps of handling the human/humanoid robot interaction according to different engagement modes. In an initialization step 402, the robot is not tracking a human. After a while, the robot may be in one of the three engagement modes. FIG. 4a is described for the unengaged mode and variations from the general steps for the fully-engaged and semi-engaged modes are referred as a 'go to FIG. 4b or 4c' respectively.

The process allows determining on step 404 the content of the stimuli store. If the store is empty (branch Yes) the process allows the robot to wait for a first stimulus to be detected on 408 to continue the process, otherwise if the store is not empty (branch No), the process allows entering a step 406 of selecting a best stimulus among the stimuli in the store.

Depending on the type of the stimuli selected either from the content of the store directly or from the content of the store and from a new stimulus detected, different scenarios 410 are launched depending on the current engagement mode of the robot.

If a People stimulus is selected 410-1 the process allows determining the current engagement mode of the robot:

If in the unengaged mode (FIG. 4a), meaning the robot may be diverted by an event and break its current activity, the process allows entering a routine 412 of watching person's position. The watching person's position routine allows determining if the robot is already tracking a person or not. If yes, the process allows stopping the current tracking, looking at the position of the new person by actuating head movement and starting to track 413 the new person detected. When the robot enters in a tracking mode, the process then loops back to step 404, and in parallel, a sub-routine is started which allows to regularly check 415 if the human currently tracked is still present in the robot environment. If it is determined that the human is not there anymore and has disappeared, the tracking routine stops and a Reset-Head stimulus is added in the stimuli store.

If in the fully-engaged mode (FIG. 4b), meaning the robot cannot be diverted by any event, the process allows determining 510 if the robot is already tracking a person or not. If yes, the process goes back to step 404 otherwise the process continues to step 412 with the watching person's position routine.

After execution of routine 412, the process allows determining if the robot is in the semi-engaged mode (FIG. 4c), meaning the robot may be diverted by an event but may revert back to its previous activity. If the robot is already tracking a person 520, the process continues at step 522 by triggering the pseudo-stimulus Force-People to have the robot tracking the current person, and the process loops back to step 404. If the robot is not already tracking a person, the process continues to step 413 by starting a tracking activity with the new person detected and the process continues as previously described with steps 415 and 426.

If a Non-People stimulus is selected 410-2 the process allows determining the current engagement mode of the robot:

If the robot is in the unengaged mode (FIG. 4a), the process allows entering a routine 414 of watching stimulus position thus orienting the sensors towards the position of the stimulus. The watching stimulus position routine allows determining if the robot is already tracking a person or not. If yes, the process allows stopping the current tracking. If not, the process allows using the indication of the event position of the non-people stimulus by actuating head movement to then determine if a human is found in an area around the position of the event.

If the robot is in the fully-engaged mode (FIG. 4b), the process allows determining 510 if the robot is already tracking a person or not. If yes, the process goes back to step 404 otherwise the process continues to step 414 with the watching stimulus position routine.

After execution of routine 414, the process allows determining if the robot is in the semi-engaged mode (FIG. 4c). If the robot is already tracking a person 520, the process continues at step 522 by triggering the pseudo-stimulus Force-People to force the robot tracking the current person, and the process loops back to step 404. If the robot is not already tracking a person, the process continues to step 417 by entering a routine of checking for a human in its environment.

If a human is found 420, the process continues at step 422 by triggering the pseudo-stimulus Force-People to have the robot tracking the new person found, and the pseudo-stimuli Force-People is updated in the stimuli store with the data of the newly found human. Then, the process loops back to step 404.

If no human is found at step 420, the process continues at step 424 by determining if the robot was previously in a tracking activity. If yes, the process continues at step 425 by triggering the pseudo-stimulus Force-People to have the robot tracking the last person previously tracked. The pseudo-stimuli Force-People is added in the stimuli store with the data of the last tracked human. If the robot was not previously in a tracking activity, the process continues to step 426 to store the Reset-Head pseudo-stimulus in the stimuli store, and loops back to step 404.

Alternatively, pseudo-stimuli (410-3, 410-4) may be selected and processed to generate an action of the robot.

When the Force-People stimulus 410-3 is selected, the robot is forced entering the watching person's position routine 412. The watching person's position routine allows determining if the robot is already tracking a person or not. If yes, the process allows stopping the current tracking, looking at the position of the new person by actuating head movement and entering a new tracking activity 413 with the new person detected. If the robot is not yet tracking a person, the process allows the robot to watch in the direction of the stimulus and starting the tracking routine 413 as previously described.

When the Reset-Head stimulus 410-4 is selected, the robot is forced entering a Try Reset-Head' routine 416 allowing the robot to wait for some time, and after a while if the head is not moving and no stimuli is processed, the routine allows the robot's head be reset to a default position. The process loops back to step 404.

As described, the present invention implements an awareness tracker within a robot to allow a closer interaction with human.

The person skilled in the art will appreciate that the embodiment has been presented for purposes of illustration and description, and is not intended to be exhaustive nor limiting the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to a preferred embodiment, various changes in form and detail may be made therein without departing from the spirit, and scope of the invention. Specifically, the present invention is well suited and easily applicable by a person skilled in the art to any form, size of robot that allows a human interaction.

The present invention can take the form of a computer program product accessible from a computer-usable or computer-readable medium providing program code for use by, or in connection with a computer or any instruction execution system. For the purposes of this description, a computer-usable or computer-readable medium can be any tangible apparatus that can contain, store, communicate, propagate, or transport the program for use by, or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention claimed is:

1. A method, implemented within a humanoid robot, of handling humanoid robot interaction with a human, the method comprising the steps of:
   detecting from a plurality of detectors all events within a humanoid robot environment;
   processing each event detected and storing each event detected in a stimuli store as a temporary stimulus with at least an indication of a position of each respective event detected, the temporary stimuli being grouped by type in the stimuli store, the stimuli store further storing permanent stimuli not detected by the plurality of detectors;
   detecting that the humanoid robot is entering an engagement mode representing a tracking relationship of the humanoid robot with a human, wherein the engagement mode being one of a fully-engaged mode, a semi-engaged mode, or an unengaged mode;
   processing a new event detected by one of the plurality of detectors and determining if the new event is a stimulus originating from a human;
   using pertinence rules, selecting one temporary or permanent stimulus stored in the stimuli store;
   processing said selected stimulus by triggering a specific scenario software routine, wherein the software routine depends on the engagement mode of the humanoid robot and on a current activity of said humanoid robot;
   stopping or continuing the engagement mode in response to the processing of said selected stimulus; and
   generating one or more physical actions of the humanoid robot.

2. The method of claim 1 wherein the events detected by the plurality of detectors are one or more of movement detection, tactile sensing, sound localization, face detection, visual perception, image recognition.

3. The method of claim 1 wherein the temporary stimuli are grouped by the type of the event detected in at least a movement stimuli group, a sound stimuli group, a touch stimuli group, a people stimuli group.

4. The method of claim 1 wherein the pertinence rules include priority criteria between the temporary stimuli and the permanent stimuli.

5. The method of claim 1 wherein the step of determining if the new event is a stimulus originating from a human consists in using information provided by a 2D camera and/or a 3D camera.

6. The method of claim 1 wherein the step of triggering the software routine further comprises the step of using the indication of the position of the event corresponding to the selected stimulus for determining if a new human is found in an area around the direction of the stimulus.

7. The method of claim 1 wherein the one or more physical actions of the humanoid robot comprise at least actuating robot members.

8. The method of claim 7 wherein the actuating robot members consists in orienting sensors towards the position of the stimulus detected.

9. The method of claim 8 further comprising the step of updating the stimuli store with information on the position of the new human found.

10. The method of claim 1 further comprising a step of maintaining the humanoid robot in a visually alive state even if no stimulus is sensed, by allowing small movements of the robot members like breathing or using LEDs or producing sounds.

11. A system for handling a humanoid robot interaction with human, the system operating under the control of an operating system and comprising:
   at least one processor; and
   means coupled to the at least one processor for implementing the steps of the method of claim 1.

12. A computer program product comprising:
   a non-transitory computer readable storage medium; and
   program code stored on the computer readable storage medium and configured, upon execution, to cause at least one processor to operate the steps of the method of claim 1.

13. The method of claim 1, wherein in the fully-engaged mode, the humanoid robot stops listening to any stimuli event and cannot be diverted until the current engaged human is lost.

14. The method of claim 1, wherein in the unengaged mode, the humanoid robot is configured to be diverted by an event and break current activity.

15. The method of claim 1, wherein in the semi-engaged mode, the humanoid robot is configured to be diverted by an event and to revert back to a previous activity.

* * * * *